Patented Sept. 19, 1922.

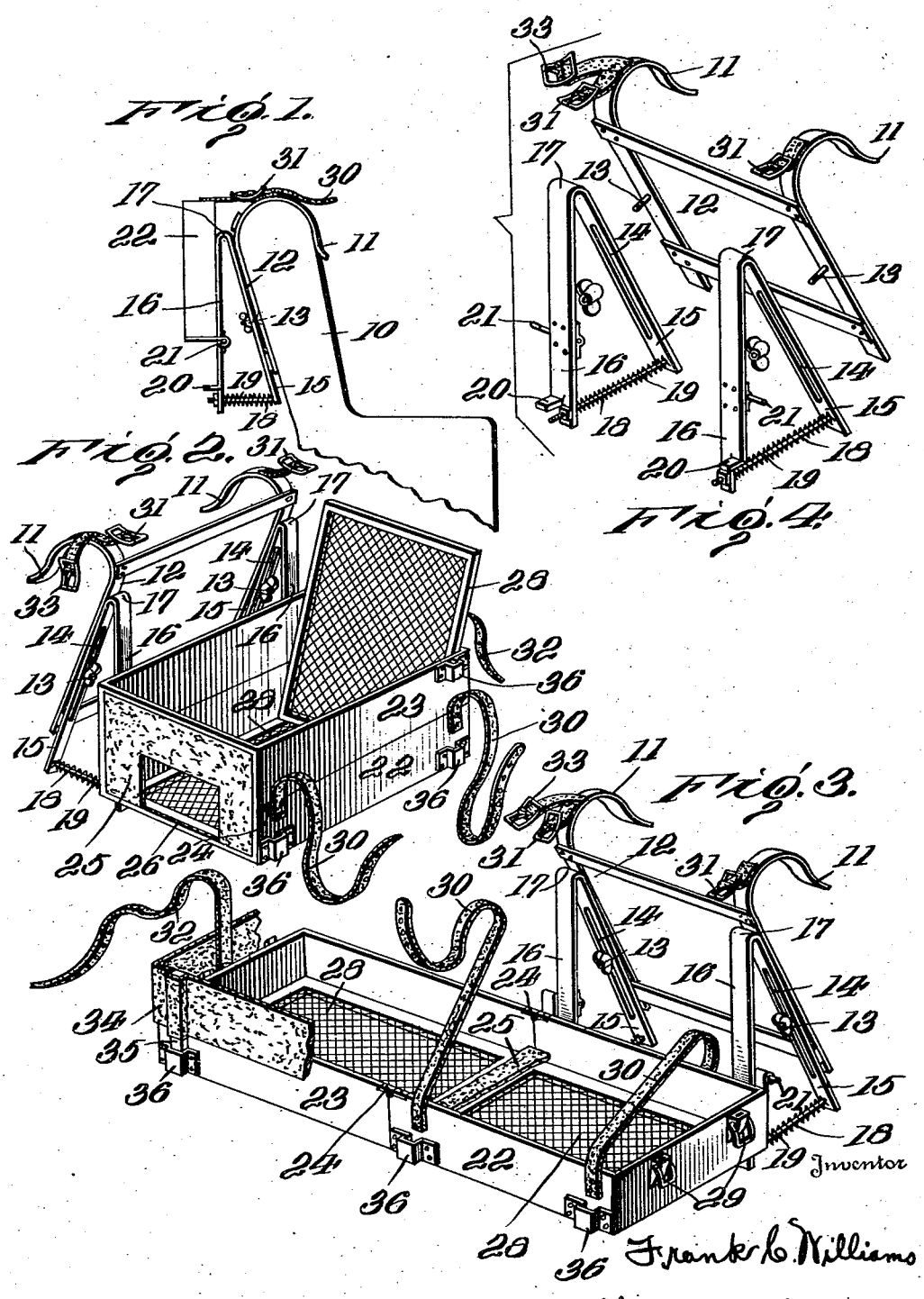

1,429,390

UNITED STATES PATENT OFFICE.

FRANK C. WILLIAMS, OF SALT LAKE CITY, UTAH.

COMBINED SEAT AND BED.

Application filed November 6, 1919. Serial No. 336,073.

*To all whom it may concern:*

Be it known that I, FRANK C. WILLIAMS, a citizen of the United States, residing at Salt Lake City, in the county of Salt Lake and State of Utah, have invented a new and useful Combined Seat and Bed, of which the following is a specification.

This invention is a combination seat and bed of the type having means whereby it may be suspended from the back of a vehicle seat.

One of the objects of the invention is to provide simple means whereby a combined seat and bed may be conveniently engaged with and disengaged from the back of a seat. A further object is to provide a seat of the character mentioned which may be folded up out of the way when not in use. A further object is to provide means whereby the device may be supported in a level position irrespective of the angle of the back of the vehicle seat. A further object is to provide means for absorbing shocks caused by travel over rough roads.

The invention will be hereinafter fully set forth and particularly pointed out in the claims.

In the accompanying drawing:—

Figure 1, is an end view illustrating a vehicle seat with the invention applied thereto, the parts being extended and folded to the back of the vehicle seat. Figure 2 is a perspective view illustrating the combination seat and bed detached from the vehicle seat and folded to function as a seat. Figure 3, is a similar view illustrating the parts extended to provide a bed. Figure 4, is a detail perspective view illustrating the supporting device.

Referring to the drawing, 10 designates a vehicle seat, conventionally shown, such for instance as is in common use on automobiles. As shown in the drawings the back of the seat is engaged by the hook like suspension members 11 of a suspension frame 12, constructed of any desired material but illustrated as being formed of flat metal bars united to form a rectangular frame. The hooks and frame are preferably covered with felt or any other desired material capable of protecting the back of the seat and the upholstery.

Passed through the vertical members of the frame 12, are bolts 13, positioned to be passed through slots 14, formed in the rear members 15 of supporting devices. Each supporting device consists of a rear member 15 and a bracket member 16, formed of a single piece of metal bent upon itself to provide a resilient connection 17, acting to hold the free ends of the members 15 and 16 normally separated, and permitting relative movement of said free ends. By reason of the bolt and slot connection between the frame 12 and the bar 15, the vertical position of said bar with respect to the frame 12 may be varied. The lower ends of the bars 15 and the bracket members 16 are held normally and yieldably separated by springs 18 which serve to absorb shocks due to travel over rough roads, and bolts 19 co-operate with said bars 15 and brackets 16 in such a manner that the bracket members may always be maintained in a vertical position irrespective of the angle of the back of the seat. The bracket members 16 are provided with support lugs 20 and with pintles 21.

The combined seat and bed consists of two box like sections 23, 23, hinged together at 24 so that they may be folded over one on top of the other or opened out, as illustrated in Figures 2 and 3 respectively. The hinged ends of the sections are provided with a fabric partition 25 as illustrated in Figure 2, provided with an opening 26. The bottoms of the sections are provided with detachable mattress sections 28, which are arranged in the position shown in Figure 2 when the device is to be used as a seat and shown in Figure 3 when the device is to be used as a bed. Spring fastening devices 29 are employed to lock the sections together when in the folded position of Figure 2.

When the parts are opened out as illustrated in Figure 3 the outer edge of the section 22 is supported by means of straps 30 which co-operate with buckles 31 attached to the hook members 11. The end of the section 23 is supported by a strap 32 which engages a buckle 33 carried by one of the hook members 11. If desired the bed may be provided with an extra side member 34 of suitable flexible material, held in position by bars 35 engaging sockets 36, as shown in Figure 3.

In practice the hook members 11 are engaged with the back of the vehicle seat 10, and the bars 15 are adjusted to bring the bracket members 16 to the proper level, being held in adjusted position by tightening up the nuts on the bolts 13. The bolts 19 are then adjusted to bring the bracket members 16 to a vertical position. The section 22 is then connected up with the hinge pintles 21 so as to swing thereon with the weight of the inner side resting upon the lugs 20. By placing the members 21 in the position shown in Figure 2 a seat and back for a child is provided, the opening 26 allowing ample room for the feet to stick out. When it is desired to use the device as a bed the section 23 is opened out as illustrated in Figure 3, and the straps and buckles connected to support the parts. If it is desired to fold the device up out of the way it is swung back on the pintles 21 either while extended or folded, and held in the new position by engaging the straps 30 with the buckles 31.

From the foregoing it will be readily understood that a very simple and inexpensive combined seat and bed is provided which may be attached to any type of vehicle seat and adjusted to hold the bed and seat in a proper position irrespective of the contour of the vehicle seat. It will be particularly noted that the device may be folded over so as to take up but little space when not in use.

Having thus explained the nature of the invention and described an operative manner of constructing and using the same, although without attempting to set forth all of the forms in which it may be made, or all of the forms of its use, what is claimed is:—

1. A combined seat and bed comprising a suspension frame provided with suspension hooks shaped to fit over the back of a vehicle seat or the like, spaced apart supporting devices having arms secured to said frame and also having depending supporting members in spaced relation with said arms, and a body pivoted to said depending supporting members.

2. A combined seat and bed comprising a suspension frame provided with hooks shaped to fit over the back of a vehicle seat or the like, spaced apart supporting devices having depending supporting members, means whereby said members are adjustably secured to said frame and maintained in spaced relation, and a body pivoted to said depending supporting members.

3. A combined seat and bed comprising a suspension frame, supporting devices each consisting of two movably connected members having free ends and provided with yieldable means acting to normally separate said free ends, means for attaching said supporting devices to said suspension frame, a main body section pivoted to said supporting devices, and a supplemental body section pivoted to the main section.

4. A combined seat and bed comprising a suspension frame, supporting devices each consisting of two movably connected members having free ends, yieldable means acting to normally separate said free ends, means for adjustably connecting said supporting devices to the suspension frame, a main body section pivoted to said supporting devices, and a supplemental body section pivoted to the main section.

5. A combined seat and bed comprising a suspension frame, supporting devices each consisting of two movably connected members having free ends and provided with yieldable means acting to normally separate said free ends, means for adjustably limiting the separation of said ends, means for attaching said supporting devices to the suspension frame, and a body section pivoted to said supporting devices.

6. A combined seat and bed comprising a suspension frame, supporting devices each consisting of two movably connected members having free ends, springs normally separating the said free ends, bolts engaging said free ends to limit separation thereof, means for attaching said supporting devices to the suspension frame, and a body section hinged to the supporting devices.

7. A combined seat and bed comprising a suspension frame, bolts carried thereby, supporting devices having slots to receive said bolts, a main body section pivoted to said supporting devices, and a supplemental body section hinged to the main body section.

8. A combined seat and bed comprising a suspension frame, bolts carried thereby, supporting devices each consisting of two movably connected members having free ends, one member of each supporting device being slotted to receive a bolt carried by the suspension frame, means for yieldably holding the free ends normally separated, and a body section hinged to the supporting devices.

9. A combined seat and bed comprising a suspension frame provided with hooks shaped to fit over the back of a vehicle seat or the like, spaced apart supporting members, means whereby said members are adjustably secured to said frame and in spaced apart relation to each other, a main body section hinged to said supporting members, a supplemental body section pivoted to the main body section, and flexible supporting members for the outer sides of said sections having means for engaging said suspension frame.

10. A combined seat and bed comprising a suspension frame, supporting devices each consisting of two movably connected members having free ends, yieldable means acting to normally separate said free ends, means for attaching said supporting devices to said suspension frame, and a combined seat and bed pivoted to said supporting devices.

In testimony whereof I have hereunto set my hand.

FRANK C. WILLIAMS.